Aug. 28, 1956
J. A. MAS
2,761,075
VIBRATION POWER SUPPLY SYSTEM AND VIBRATOR
STRUCTURE USEABLE THEREIN
Filed Jan. 19, 1953
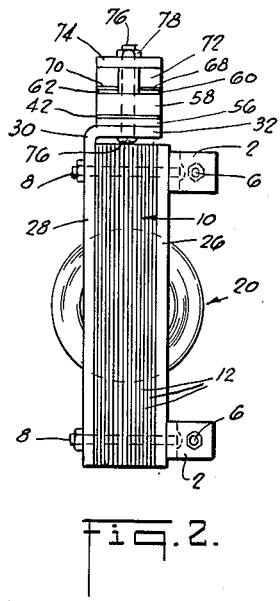
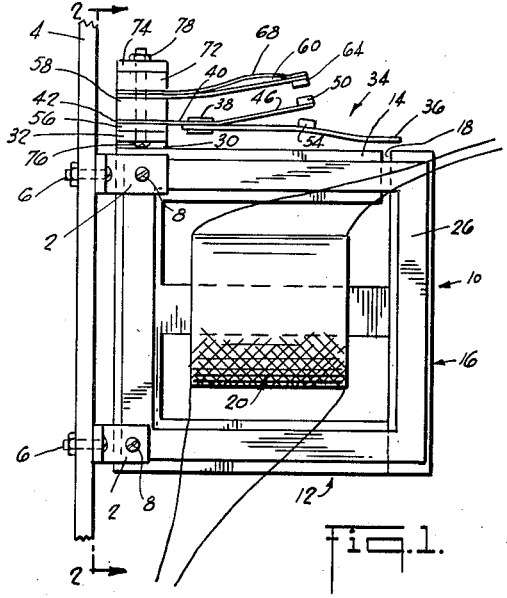
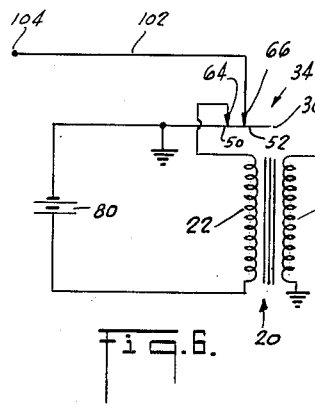
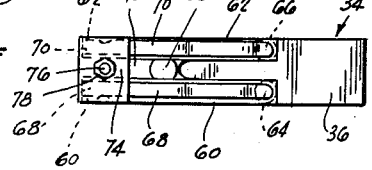
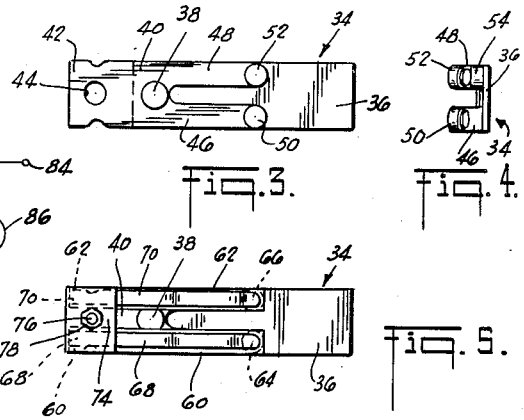
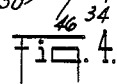
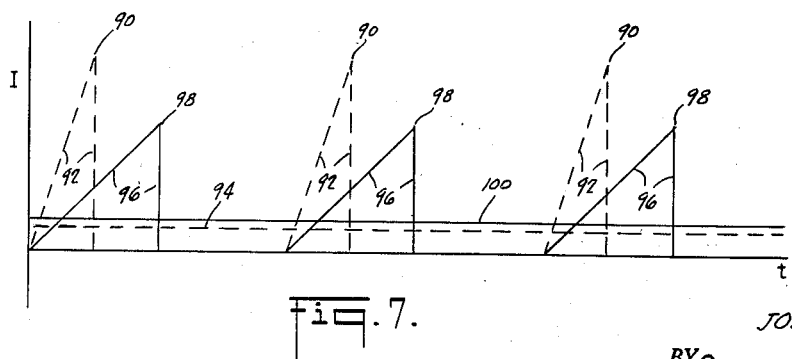
INVENTOR.
JOSEPH A. MAS
BY James and Franklin
ATTORNEYS

United States Patent Office 2,761,075
Patented Aug. 28, 1956

2,761,075

VIBRATION POWER SUPPLY SYSTEM AND VIBRATOR STRUCTURE USEABLE THEREIN

Joseph A. Mas, Elmont, N. Y., assignor to Vibration Research Laboratories, Inc., Flushing, N. Y., a corporation of New York Application January 19, 1953, Serial No. 331,864

18 Claims. (Cl. 307—132)

The present invention relates to a vibrator power supply system the current consumption and power output of which is substantially independent of wide variations in the input voltage applied thereto, and in which an interrupted output may be produced the time characteristics of which are substantially independent of variations in the voltage of the source of input power, and to a vibrator of novel construction for use in such a system.

In many installations it is desired to produce a high voltage from a source of power having a low voltage. One conventional way of accomplishing this object is to periodically interrupt the current derived from the power source, which may be a dry cell or the like, and through transformer means step up the voltage in an output circuit, the output circuit including a rectifier so that a substantially steady voltage is produced which is higher than the voltage of the power source. Vibrators usable in such systems have become standard items on the market, and they assume a number of comparatively conventional forms. One difficulty with a system of this type is that the current consumption will vary to a marked degree and in the same direction as the magnitude of the voltage input. Where a dry cell or the like is employed as the input voltage source, as the system is used the dry cell will run down, its output voltage will decrease, and consequently the current consumption and power output of the system will correspondingly decrease. Various means have been provided in an attempt to eliminate this defect, but they are all characterized either by complexity, expensiveness, waste of power, or combinations thereof.

According to the present invention a vibrator power supply is produced in which the current consumption and power output is substantially constant over a wide range of variation of the magnitude of the voltage input. Indeed, what little change in current consumption and power output results from a variation in input voltage is in the inverse sense from the input voltage variation, that is to say, the higher the input voltage the lower is the current. This is a very desirable effect, since it results in a minimal power consumption on the part of the system, thus increasing the effective life of a given dry cell input power source and reducing maintenance problems attendant upon a change in batteries, and also results in a minimization of the heat loss in the system, permitting its use in applications and under ambient conditions where the use of such systems have heretofore been contraindicated. Since but a small portion of the power consumption need be dissipated merely in order to maintain the power output constant, the efficiency of the system is greatly improved over prior art systems.

These beneficial effects may be produced by utilizing a vibrator which may initially be considered as of conventional construction, including a fixed contact, a vibratile member movable toward and away therefrom and a movable contact resiliently mounted on the vibratile member so as to engage with the fixed contact when the vibratile member moves theretoward and disengage from the fixed contact when the vibratile member moves away therefrom. The vibrator is modified by providing positively acting means limiting the degree to which the vibratile member may approach the fixed contact, the vibratile member being permitted to approach the fixed contact to a degree sufficient to cause the fixed and movable contacts to engage, and even to move toward the fixed contact a further distance, but being prevented from moving toward the fixed contact to the degree to which it might otherwise move were its vibratile motion unrestricted.

For certain specific applications an output in addition to the constant voltage output is desired, the critical characteristic of this second output being that it is interrupted according to a fixed and predetermined time schedule. Attempts to secure such a voltage output through the use of mechanical vibrators either alone or in conjunction with a constant power output of the type previously described have run up against the problem that the time characteristics of the voltage output under discussion tend to vary in accordance with such changes in the voltage input as are commonly attendant upon the running down of a dry cell.

I have found that a voltage output of interrupted nature having a time characteristic which is substantially independent of changes in input voltage can be derived by utilizing the engagement and disengagement of the elements carried respectively by the vibratile member and the external structure which have previously been mentioned as positively limiting the degree to which the vibratile member may approach the fixed contact.

Therefore, by utilizing a vibrator constructed so as to operate in accordance with the above principles, in conjunction with a vibrator power supply system, I am able simultaneously to produce a first output the current and power consumption of which is substantially constant and a second output of an interrupted nature the time characteristics of which are substantially constant despite wide variation in the voltage of the input power source. If desired the same input power source can be utilized for both of the output circuits. In addition, the system in question operates at a comparatively high efficiency and has an extremely low degree of heat loss or dissipation.

To the accomplishment of the above, and to such other objects as may hereinafter appear to the present invention relates to a vibrator power supply system and to the structure of a vibrator usable therein, as defined in the appended claims and as described in this specification, taken together with the accompanying drawings in which:

Fig. 1 is a front elevational view of one embodiment of the vibrator of the present invention, showing it mounted in place on a panel;

Fig. 2 is a side elevational view of the vibrator of Fig. 1 detached from the panel;

Fig. 3 is a top plan view of the vibratile member utilized in the said vibrator;

Fig. 4 is an end elevational view of the vibratile member of Fig. 3, taken from the right hand side of Fig. 3;

Fig. 5 is a top plan view of a portion of the vibrator of Fig. 1, showing the fixed contacts, the vibratile member and the structure carried by the vibratile member, all mounted in spaced position;

Fig. 6 is a schematic circuit diagram illustrating one vibrator power supply in which the vibrator of Fig. 1 may be employed; and Fig. 7 is an idealized graphical representation of the characteristics of the constant voltage output circuit of Fig. 5 showing, for two values of input voltage, the instantaneous and average input current characteristics of that system with respect to time.

Having reference first to Figs. 1–5, a pair of L-shaped brackets 2 are secured to panel 4 by means of screws 6, screws 8 passing through the brackets 2 and serving to secure a laminated magnetic structure generally designated 10 in place. This structure is in the form of a figure-8 and is defined by two sets of laminations, one set 12 having the shape of the letter E and with the upper arm 14 somewhat shorter than the other arms, the other set of laminations 16 being in the form of a straight bar against which the tips of the two lower arms of the laminations 12 abut, an air gap 18 thus being defined between the upper end of the bar laminations 16 and the tip of the upper arm 14 of the E-shaped laminations 12. A transformer 20 is wound around the central arm of the magnetic structure 10, that transformer in the form here disclosed being constituted by concentrically wound primary coil 22 and secondary coil 24. It will be understood that an auto-transformer structure or any other suitable transformer structure could be here employed.

A rectangular frame 26 of some non-magnetic material such as aluminum or the like is secured to that side of the magnetic structure 10 facing the observer in Fig. 1, the frame 26 conforming to the periphery of the magnetic structure 10. On the opposite face of the magnetic structure 10 is a somewhat similar aluminum frame 28 having a corner portion 30 which extends above the magnetic structure 10 and terminates in a horizontal supporting arm 32 extending across a portion of the top of the magnetic structure 10.

A vibratile member generally designated 34 is mounted on the supporting arm 32, the vibratile member 34 comprising a sheet or plate 36 of magnetizable material one end of which extends over the air gap 18 and the other end of which is secured, by means of rivet 38, to a strip 40 of resilient material such as steel, one end 42 of that strip extending laterally away from the magnetizable strip 36 so as to be mounted on and supported by the arm 32, being provided with an aperture 44 for that purpose. The other end of the resilient strip 40 is bifurcated so as to define a pair of resilient arms 46 and 48, those arms being bent so as to incline upwardly from the magnetizable sheet 36 and carrying contact tips 50 and 52 respectively at their extremities. The magnetizable strip 36 carries a built up portion or stop 54 directly below the free end of the arm 48, that built up portion or stop 54 constituting an abutment against which the arm 48 is adapted to engage when that arm is forced toward the magnetizable sheet 36, said built-up portion or stop 54 thus limiting the degree to which the contact portion 52 may approach the magnetizable sheet 36, the contact portion 50 carried by the arm 46 having a greater degree of permissible motion toward the magnetizable sheet 36 by reason of the fact that no abutment is provided therebeneath. In order to provide for proper vertical spacing of the vibratile member 34 with respect to the electromagnet 10, a spacer 56 is interposed between the end 42 of the resilient sheet 40 and the supporting arm 32.

An insulating spacer 58 is positioned above the portion 42 of the resilient sheet 40, and on top of that a pair of laterally spaced and comparatively rigid electrically conductive arms 60 and 62 are mounted, these arms carrying at their extremities fixed contact tips or portions 64 and 66 respectively. In order to further rigidify the arms 60 and 62 and provide for absorption of the shock incident to the operation of the vibrator it is sometimes desired to provide strong spring strips 68 and 70 above the arms 60 and 62 respectively and engageable with the free ends of said arms above the contact portions 64 and 66 respectively. A second insulating spacer 72 is mounted above the left hand ends of the arms 60 and 62 (and corresponding ends of the spring arms 68 and 70 when employed), an aluminum clamping strip 74 is placed atop the insulating spacer 72, and the entire mounting assembly is held in place on the supporting arm 32 by means of screw 76 and nut 78, the screw being centrally disposed with respect to the mounting portions so as to pass through the aperture 44 in the resilient strip 40 and pass between the clamped ends of the arms 60 and 68 on the one hand and 62 and 70 on the other hand. Any conventional means may be employed to make electrical connection with the resilient sheet 40 and with the individual conductive arms 60 and 62, the electrical connection to the resilient sheet 40 serving as a common electrical connection to the two contact portions 50 and 52, those portions being electrically connected by reason of the fact that they are attached to integrally joined conductive arms 46 and 48. It will further be realized that the contact portions 64 and 66 at the ends of the conductive arms 60 and 62 are electrically separate and unconnected.

Fig. 6 illustrates one circuit in which the vibrator of the present invention may be employed. The circuit discloses a fairly conventional vibrator power supply system in which an input power source 80 of, for example, the dry cell battery type, is connected to the primary coil 22 of the transformer 20 via the fixed contact 64 and the movable contact portion 50 carried by the vibratile member 34. When the fixed contact 64 and the contact portion 50 carried by the vibratile member 34 engage, current will start to flow through the primary coil 22, the electromagnet 10 will be energized, the vibratile member 34 will be attracted thereto, in moving toward the air gap 18 the vibratile member 34 will cause the movable contact portion 50 to disengage from the fixed contact 64, the circuit through the coil 22 will be broken, the current therethrough will decay, the energization of the electromagnet 10 will fall off, the resiliency of the sheet 40 will cause the vibratile member 34 to move once again toward the fixed contact 64, the contact portion 50 will once again engage with the fixed contact 64, and the cycle will continue. While the current in the primary coil 22 is alternately building up and decaying, a voltage will be induced in the secondary coil 24, this voltage being passed through a rectifier 82 to the output terminal 84, a voltage regulating tube 86 being connected across the output circuit to stabilize the output voltage and a capacitance 88 being connected across the output circuit to filter out undesired ripple frequencies.

In the system as thus described, the current produced in the output circuit and consumed in the input circuit will be considerably greater when the voltage input source 80 is constituted by a fresh dry cell having a voltage output of 3 volts than when that dry cell has become depleted so that its voltage is, for example, only 2 volts. It is here that the contact portion 52, the fixed contact 66 and the abutment 54 come into play. Insofar as the constant voltage output circuit is concerned, the effect of these additional contact means may be considered independently of their electrical connections. When the vibratile member 34 approaches the fixed contact 64 and after the contact portion 50 has engaged with the fixed contact 64 the vibratile member 34 will continue to move upwardly for an appreciable period of time, until the strength of the electromagnet 10 has reached sufficient proportions to attract the magnetizable sheet 36 downwardly. During this additional motion the contact portion 50, being mounted on the end of resilient arm 46, will be moved toward the magnetizable sheet 36 or, more properly, the magnetizable sheet 36 will continue to rise while the position of the contact portion 50 remains fixed, thus decreasing the spacing between them. While this is going on the contact portion 52 at the end of the resilient arm 48 has engaged with the fixed contact 66, and the continued upward motion of the vibratile member 34 causes it to approach the arm 48 until the abutment 54 engages the underside of that arm. At this point continued upward movement of the vibratile member 34 is positively prevented. This has a very important effect on the operating characteristics of the power supply which may best be understood from an examination of Fig. 7, the horizontal coordinate of the graph there disclosed representing time and the vertical coordinate representing current. The saw-tooth curves 92 and 96 represent idealized versions of the instantaneous current passing through the primary coil 22, while the horizontal lines 94 and 100 represent the average value of that current. The solid lines 96 and 100 represent the situation which obtains when the input portion source 80 has a low value of, for example, 2 volts, while the broken lines 92 and 94 represent the situation which obtains when the voltage of the source 80 has a higher value such as 3 volts. When the upward motion of the vibratile member 34 is positively limited, as by the simultaneous engagement of fixed contact 66, contact portion 52, and the stop or abutment 54, a higher voltage at the source 80 will, when the contact portion 50 engages the fixed contact 64, cause the current in the coil 22 to rise at a comparatively rapid rate, but the operating characteristics of the system including the vibrator of the present invention result in a very quick cut-off of that current through disengagement of the contact portion 50 and the fixed contact 64, as indicated by the points 90 on the broken line instantaneous current curve 92. While the drawing of Fig. 7 is schematic only, it may be mentioned for purposes of specificity that in a vibrator power supply according to the schematic of Fig. 5 and designed to produce an output voltage of 660 volts at 20 micro amperes, the primary coil 22 having 275 turns, the secondary coil 24 having 12,000 turns and the condenser 88 having a value of 0.1 microfarads, the average current consumption is approximately 30 milliamperes when the voltage source 80 delivers 3 volts, as indicated by the horizontal broken line 94 in Fig. 7.

When the voltage of the source 80 decays to a value, for example, of 2 volts, the current in the primary coil 22 will increase at a less rapid rate than formerly when the contact portion 50 engages the fixed contact 64, as indicated by the solid lines 96 in Fig. 7, but with the use of means for positively limiting the degree to which the vibratile member 34 may approach the fixed contacts 64 and 66 the contact portion 50 will remain engaged with the fixed contact 64 for a longer period of time, as indicated by the points 98 on the solid line curves 96, leading to the experimentally observed and anomalous situation that the average current increases to a value of approximately 44 milliamperes, as indicated by the horizontal solid line 100. By way of comparison, in a conventional power supply circuit, where the current in the input circuit is substantially linearly related to the input voltage, if a current of 44 milliamps was produced when the input voltage was 2 volts, an input voltage of 3 volts would result in a current consumption of 66 milliamps. Since the power loss is related to the square of the current, the value of the instant invention will be apparent. The maximum power consumption of the system of the present invention is not only considerably less than the maximum power consumption of a system of conventional type but the variation in power consumption with change in input voltage in the present system is not even comparable to that in conventional systems.

Moreover, it has been discovered that the length of time during which the contact portion 52 is in engagement with the fixed contact 66, where the degree of approach of the contact portion 52 to the magnetizable sheet 36 is positively limited by means of the stop or abutment 54, is substantially constant irrespective of variations in the voltage of the input power source 80. Consequently, as illustrated in Fig. 6, if an electrical connection 102 is provided between the fixed contact 66 and a second output terminal 104, interrupted voltage is delivered to the output terminal 104 and the time characteristics of that interruption are substantially constant even while the power source 80 runs down. Thus the very same structure which permits the attainment, in the constant voltage system, of substantially constant current output and power consumption with wide variation in the input voltage, can also, simply and inherently and without the use of additional equipment or parts, produce a second voltage output having a substantially constant time characteristic. For example, in the system previously specifically mentioned, having a 660 volt output at 60 microamperes, an interrupted voltage output is produced at the output terminal 104 having a 22% time constant which is substantially uniform.

I am not prepared at this time to explain this phenomenon in a theoretical way. However, that the phenomenon does exist has been experimentally determined, and that the phenomenon can be reliably reproduced in production models has been demonstrated in practice. The invention should therefore be regarded, at the present state of understanding thereof, as an empirical one.

The contact portion 52 is here disclosed as resiliently mounted on the vibratile member 34, the normal spacing between the arm 48 and the stop or abutment 54 determining the time constant of the voltage output at terminal 104. If an interrupted voltage output with a substantially uniform time constant is not desired, it will be understood that any other means may be employed for positively limiting the degree of movement of the vibratile member 34 toward the fixed contact 64, that means including a pair of elements, one fixedly supported and the other carried by the vibratile member 34, the two elements engaging to limit the approach of the vibratile member 34 to the fixed contact 64 at any desired portion of the otherwise permitted vibratile motion of the member 34, provided, of course, that the contact portion 50 and the fixed contact 64 engage prior to the limiting of the upward movement of the vibratile member 34. It will further be realized that other structures could be employed, even where the contact portion 52 is to be mounted on the vibratile member 34 with a limited permissible degree of motion relative thereto. For example, the abutment 54 could be provided on the arm 52 rather than on the magnetizable sheet 36, or the abutment proper could be eliminated, the fixed contact 66 being positioned below the fixed contact 64, instead of on a level therewith, so as to engage with the contact portion 52 before the contact portion 50 engages with the fixed contact 74, upward movement of the vibratile member 34 causing the fixed contact 66 to bend the arm 48 downwardly with respect to the vibratile member 34 and into engagement with the magnetizable sheet 36 itself, said engagement occurring only after the contact portion 50 has engaged with the fixed contact 64. Other modifications of structure, all within the scope of my invention as defined in the following claims, will also suggest themselves.

I claim:

1. A vibrator comprising a support, a vibratile member mounted thereon, means for causing said member to vibrate, a pair of resilient arms carried by said member and having contact portions, said contact portions being movable toward and away from said member by virtue of the resiliency of said arms, an abutment between said member and one of said arms for limiting the degree to which said arm may approach said member, means for permitting a greater degree of approach to said member on the part of said other arm, and a pair of relatively fixed contacts on said support on the other side of said contact portions from said member, normally separated from said contact portions and engageable with them when said member moves toward said fixed contacts during its vibratory motion.

2. The vibrator of claim 1, in which said contact portions are electrically connected and said fixed contacts are electrically separated.

3. The vibrator of claim 1, in which said contact portions are normally substantially uniformly spaced from said member and said fixed contacts are also substantially uniformly spaced therefrom but by a greater distance.

4. The vibrator of claim 3, in which said contact portions are electrically connected and said fixed contacts are electrically separated.

5. A vibrator comprising a support, a pair of fixed contacts mounted thereon, a vibratile member on said support movable toward and away from said fixed contacts, both of said fixed contacts being on the same side of said member, means for causing said member to vibrate, a pair of contact portions carried by said member, normally spaced from said fixed contacts but each adapted to engage one of said fixed contacts when said member moves theretoward, one of said portions being yieldably mounted on said member so as to be normally spaced therefrom in the direction of the fixed contact with which it is engageable but moveable toward said member to a predetermined extent, and means for permitting the other of said portions to be movable toward said member to a lesser degree than said one portion, said other portion being so positioned on said member as, while in its position of closest approach to said member and while said member is moving toward said fixed contacts, to engage with its fixed contact before said one portion has been forced by engagement with its fixed contact to its limit of motion toward said member.

6. The vibrator of claim 5, in which said contact portions are electrically connected and said fixed contacts are electrically separated.

7. The vibrator of claim 5, in which said contact portions are normally substantially uniformly spaced from said member and said fixed contacts are also substantially uniformly spaced therefrom but by a greater distance.

8. The vibrator of claim 7, in which said contact portions are electrically connected and said fixed contacts are electrically separated.

9. A vibrator comprising a support, a fixed contact mounted thereon, a vibratile member on said support movable toward and away from said fixed contact, contact means yieldably mounted on said member so as to be normally spaced therefrom toward said fixed contact but movable toward said member, said contact means being normally separated from said fixed contact but engageable therewith when said member moves theretoward, means for causing said member to vibrate, and elements on said member and said support respectively which operatively engage when said member moves toward said fixed contact to positively limit the approach of said member to said fixed contact, said elements being operatively effective after said contact means has engaged with said fixed contact and before said contact means has been forced by engagement with said fixed contact to its limit of motion toward said member.

10. The vibrator of claim 9, in which said element on said member is resiliently mounted thereon so as to normally extend toward said other element beyond its approach-limiting position.

11. The vibrator of claim 9, in which said element on said member is mounted on a resilient structure attached to said member and normally extending therefrom toward said other element, and in which an abutment is provided between said structure and said member limiting the degree to which said structure may approach said member.

12. The vibrator of claim 11, in which said contact means is mounted on a resilient structure attached to said member and normally extending therefrom toward said fixed contact, said structure being resiliently free to approach said member when said elements are in approach-limiting engagement.

13. The vibrator of claim 11, in which said contact means is mounted on a resilient structure attached to said member and normally extending therefrom toward said fixed contact, said structure being resiliently free to approach said member when said elements are in approach-limiting engagement, in which said contact means and said element on said member are electrically connected and in which said fixed contact and said element on said frame are electrically separated.

14. The vibrator of claim 9, in which said contact means and said element on said member are electrically connected and in which said fixed contact and said element on said frame are electrically separated.

15. The vibrator of claim 9, in which the means for causing said member to vibrate is controlled by the engagement between said fixed contact and said contact means.

16. A vibrator power supply system with a current consumption substantially independent of changes in voltage input over a predetermined range comprising a source of input voltage, a transformer having primary and secondary coils, electrical connections between said input voltage source and said primary coil including a fixed contact and a movable contact, said movable contact being resiliently mounted on a vibratile member so as to be normally spaced therefrom in the direction of said fixed contact, said member being movable toward and away from said fixed contact so as to cause said movable contact to become engaged and disingaged from said fixed contact, electromagnetic means including a coil of said transformer active on said member to cause it to vibrate, an output circuit including said secondary coil and a rectifier in series therewith, and means for limiting the approach of said member to said fixed contact, said means including a fixed element and a member-carried element so spacedly related to said fixed element as to engage therewith in a rigid and motion-stopping manner when said member moves toward said fixed contact, after said fixed and movable contacts have engaged, and before said movable contact has been forced toward said member to a degree sufficient to essentially destroy the resiliently of its mounting on said member.

17. A vibrator power supply system with a first voltage output the current consumption of which is substantially independent of changes in voltage input over a predetermined range and with a second interrupted voltage output the time characteristics of which are substantially independent of said voltage input changes, comprising the power supply system of claim 16 and a second output circuit comprising a voltage input source, an electrical connection between said source and said member-carried element, said fixed element, and an electrical connection thereto.

18. The vibrator power supply of claim 17, in which the same voltage input source is utilized for both voltage output circuits, said member-carried element being electrically connected to said movable contact, said fixed element being electrically separated from said fixed contact.

References Cited in the file of this patent

UNITED STATES PATENTS

| 1,819,617 | Nloser | Aug. 18, 1931 |
| 1,863,975 | Feild et al. | June 21, 1932 |
| 1,935,569 | Keogh | Nov. 14, 1933 |
| 1,940,496 | James | Dec. 19, 1933 |
| 2,140,094 | Sullivan | Dec. 13, 1938 |
| 2,152,184 | Gostin et al. | Mar. 28, 1939 |
| 2,197,607 | Brown | Apr. 16, 1940 |
| 2,445,382 | Aust | July 20, 1948 |
| 2,519,730 | Aust et al. | Aug. 22, 1950 |

FOREIGN PATENTS

| 577,482 | Great Britain | May 20, 1946 |
| 615,118 | Great Britain | Jan. 3, 1949 |